US012168635B2

(12) United States Patent
Nasu et al.

(10) Patent No.: US 12,168,635 B2
(45) Date of Patent: Dec. 17, 2024

(54) POROUS CERAMIC LAMINATE AND METHOD FOR PRODUCING THE SAME

(71) Applicant: SUMITOMO CHEMICAL COMPANY, LIMITED, Tokyo (JP)

(72) Inventors: Tomomichi Nasu, Ehime (JP); Atsushi Nakayama, Ehime (JP); Kousuke Uoe, Ibaraki (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 724 days.

(21) Appl. No.: 17/283,485

(22) PCT Filed: Oct. 9, 2019

(86) PCT No.: PCT/JP2019/039844
§ 371 (c)(1),
(2) Date: Apr. 7, 2021

(87) PCT Pub. No.: WO2020/080225
PCT Pub. Date: Apr. 23, 2020

(65) Prior Publication Data
US 2021/0395157 A1    Dec. 23, 2021

(30) Foreign Application Priority Data
Oct. 15, 2018  (JP) ................. 2018-194512

(51) Int. Cl.
*C04B 41/87* (2006.01)
*B01D 67/00* (2006.01)
(Continued)

(52) U.S. Cl.
CPC .......... *C04B 41/87* (2013.01); *B01D 67/0083* (2013.01); *B01D 69/02* (2013.01);
(Continued)

(58) Field of Classification Search
None
See application file for complete search history.

(56) References Cited

U.S. PATENT DOCUMENTS

| 5,110,470 | A  | * | 5/1992 | Yokosawa | ............. C04B 35/457 210/500.25 |
| 2017/0007967 | A1 | * | 1/2017 | Teranishi | ............. B01D 63/066 |

FOREIGN PATENT DOCUMENTS

| JP | 56-51245 A | 5/1981 |
| JP | 62-186908 A | 8/1987 |

(Continued)

OTHER PUBLICATIONS

Yogo, K et al., Mesoporous Composite Material, Feb. 22, 2017, machine translation of JP2007-045691 (Year: 2007).*

(Continued)

*Primary Examiner* — Chinessa T. Golden
(74) *Attorney, Agent, or Firm* — Rimon P.C.

(57) ABSTRACT

A porous ceramic laminate, which can reduce pressure loss of a fluid, includes a first porous layer and a second porous layer. The second porous layer is laminated on, in contact with or via air, the first porous layer. A part of the second porous layer is laminated on, in contact with, the first porous layer. Each of the first porous layer and the second porous layer contains a metal oxide. A ratio Da/Db of an average pore diameter Da of the first porous layer relative to an average pore diameter Db of the second porous layer is 10 or more. A proportion of a portion in which a distance between the first porous layer and the second porous layer is smaller than 1 μm is 70% or less.

8 Claims, 4 Drawing Sheets

(51) Int. Cl.
  *B01D 69/02* (2006.01)
  *B01D 71/02* (2006.01)
  *C04B 38/00* (2006.01)
  *C04B 41/45* (2006.01)

(52) U.S. Cl.
  CPC ........ *B01D 71/024* (2013.01); *C04B 38/0051* (2013.01); *C04B 41/4582* (2013.01)

(56) References Cited

FOREIGN PATENT DOCUMENTS

| JP | 11-292653 A | | 10/1999 |
| JP | 2007045691 A | * | 2/2007 |
| JP | 2009-235487 A | | 10/2009 |

OTHER PUBLICATIONS

Chinese Decision of Rejection Office Action issued in corresponding Chinese Patent Application No. 201980066601.3, dated Jan. 9, 2023, with English translation.
Japanese Notice of Reasons for Refusal issued in corresponding Japanese Patent Application No. 2020-553116, dated Apr. 25, 2023, with English translation.
Extended European Search Report issued in corresponding European Patent Application No. 19874322.1-1108, dated Jun. 2, 2022.
Chinese Office Action issued in corresponding Chinese Patent Application No. 201980066601.3, dated Apr. 28, 2022, with English translation.
International Search Report issued in corresponding International Patent Application No. PCT/JP2019/039844, dated Dec. 10, 2019, with English translation.

* cited by examiner

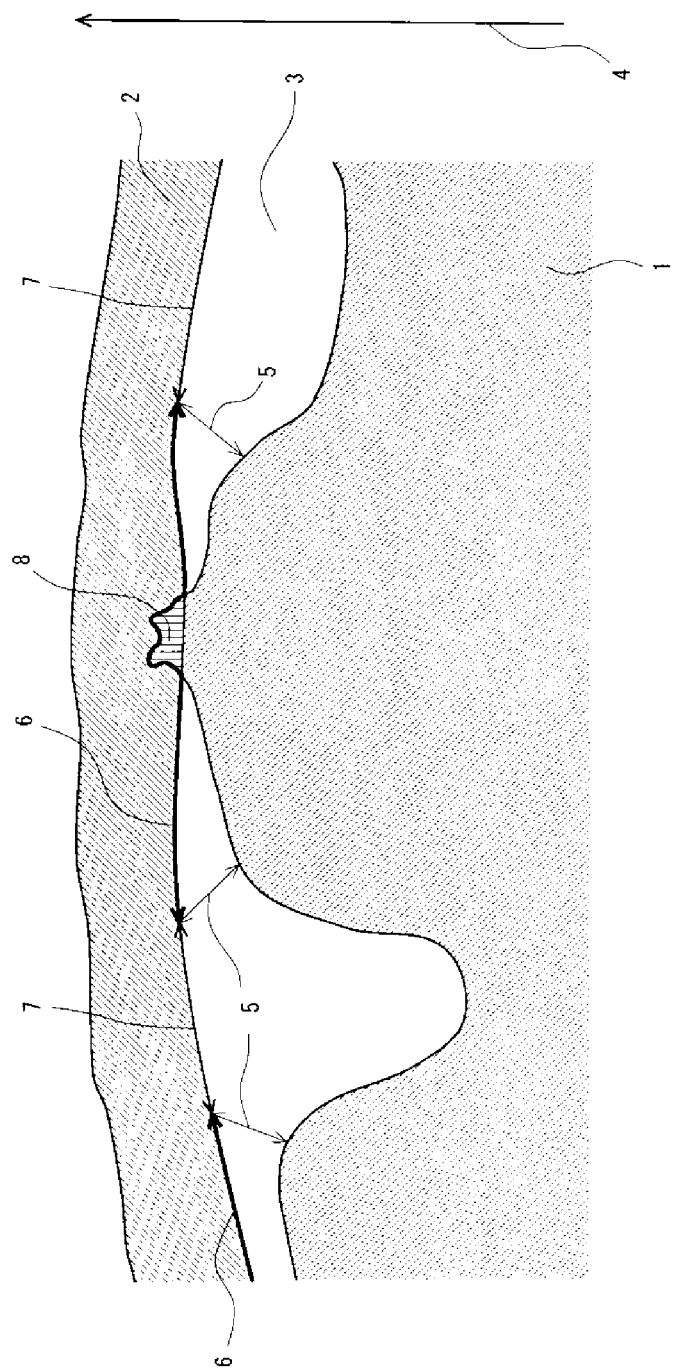
[Fig. 1]

[Fig. 2]
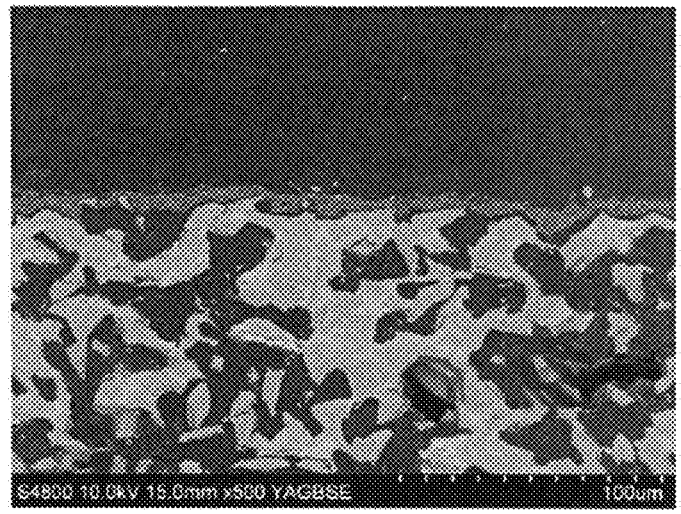
[Fig. 3]
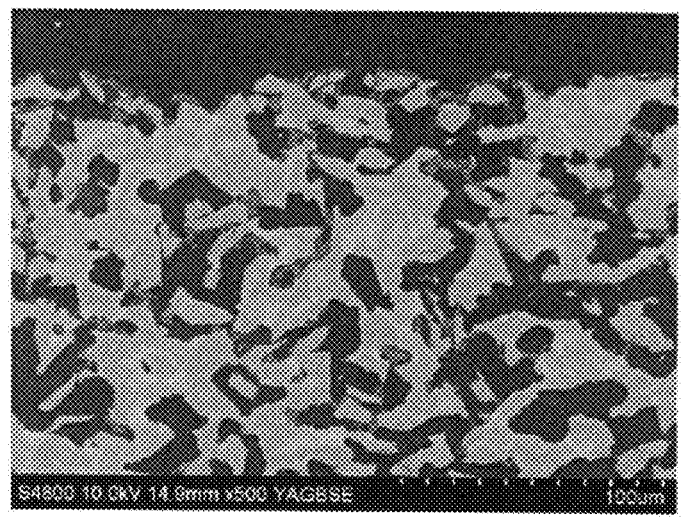

[Fig. 4]
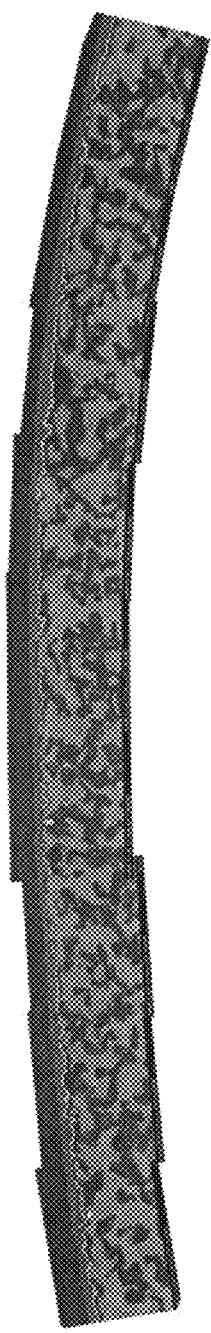

[Fig. 5]
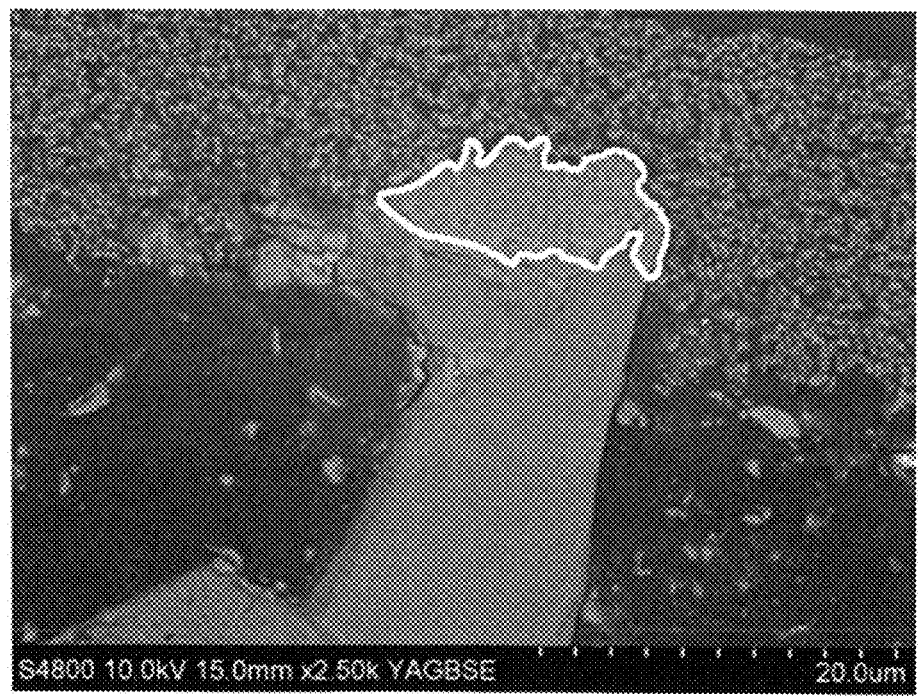

POROUS CERAMIC LAMINATE AND METHOD FOR PRODUCING THE SAME

CROSS REFERENCE TO RELATED APPLICATIONS

This application is the U.S. National Phase under 35 U.S.C. § 371 of International Application No. PCT/JP2019/039844, filed on Oct. 9, 2019, which claims the benefit of Japanese Application No. 2018-194512, filed on Oct. 15, 2018, the entire contents of each are hereby incorporated by reference.

TECHNICAL FIELD

The present invention relates to a porous ceramic laminate and a method for producing the same.

BACKGROUND ART

In various fields, porous ceramics are used as membranes, such as a microfiltration membrane, an ultrafiltration membrane, a nanofiltration membrane, a reverse osmosis membrane, an ion-exchange membrane, and a gas separation membrane, that have functions of separation, concentration, filtration, etc., of a fluid such as a gas or a liquid.

For example, Patent Literature 1 discloses a ceramic porous body which is a ceramic porous asymmetric membrane including an inorganic support body and one or more inorganic coating layers that coat the support body, the ceramic porous body including a thin-layer-shaped inorganic porous body as at least one layer among the one or more inorganic coating layers that coat the support body. In Patent Literature 1, a slurry membrane containing alumina having an average particle diameter of 3 or 5 μm is formed on a porous support body having an average pore diameter of 11.0 or 14.2 μm, and the resultant matter is baked, and then a porous layer is formed on the porous support body. Patent Literature 2 discloses an asymmetric membrane including a support layer and a porous layer formed on the inner surface or the outer surface of the support layer. In Patent Literature 2, a support layer having a continuous pore diameter of 1 to 2 μm is created by using alumina particles or particles of another inorganic substance having an average particle diameter of 5 μm, and a porous layer is formed on a surface of the support layer by using a liquid in which an alumina fine powder having an average particle diameter of 0.5 μm is dispersed.

CITATION LIST

Patent Literature

Patent Literature 1: JPH11-292653A
Patent Literature 2: JPS62-186908A

SUMMARY OF THE INVENTION

Problems to be Solved by the Invention

When separation or the like of a fluid is performed by use of a porous ceramic, it is important that the fluid easily flows in the ceramic porous body while the function of separation or the like is sufficiently exhibited, i.e., that pressure loss of the fluid is small. However, in Patent Literature 1 and 2, it is considered to be difficult to reduce the pressure loss of the fluid.

Therefore, an object of the present invention is to provide a porous ceramic laminate that can reduce pressure loss of a fluid.

Solution to the Problems

The invention that achieved the above problem is as follows.

[1] A porous ceramic laminate comprising a first porous layer and a second porous layer, wherein
the second porous layer is laminated on, in contact with or via air, the first porous layer,
a part of the second porous layer is laminated on, in contact with, the first porous layer,
each of the first porous layer and the second porous layer contains a metal oxide,
a ratio $D_a/D_b$ of an average pore diameter $D_a$ of the first porous layer relative to an average pore diameter $D_b$ of the second porous layer is 10 or more,
a proportion of a portion in which a distance between the first porous layer and the second porous layer is smaller than 1 μm is 70% or less.
[2] The porous ceramic laminate according to [1], wherein the $D_a/D_b$ is 30 or more.
[3] The porous ceramic laminate according to [1] or [2], wherein the proportion of the portion in which the distance between the first porous layer and the second porous layer is smaller than 1 μm is 50% or less.
[4] The porous ceramic laminate according to any one of [1] to [3], wherein
the first porous layer contains, as the metal oxide, a metal oxide A and a metal oxide B having a melting point higher than a melting point of the metal oxide A,
the second porous layer contains, as the metal oxide, a metal oxide C having a melting point higher than the melting point of the metal oxide A, and
the porous ceramic laminate includes a region that is in contact with both of the first porous layer and the second porous layer and that contains the metal oxide A and the metal oxide C.
[5] A method for producing the porous ceramic laminate according to any one of [1] to [4], the method comprising:
a step of applying a water repellent agent or an oil repellent agent to at least one surface of the first porous layer;
a step of applying a slurry containing a thickener, a solvent, and the metal oxide contained in the second porous layer, to the surface of the first porous layer to which the water repellent agent or the oil repellent agent has been applied; and
a step of heat-treating the first porous layer to which the slurry has been applied.

Advantageous Effects of the Invention

The porous ceramic laminate of the present invention can reduce pressure loss of a fluid such as a gas or a liquid.

BRIEF DESCRIPTION OF THE DRAWINGS

FIG. 1 is a schematic diagram showing a cross section of a porous ceramic laminate in a preferred mode of the present invention.
FIG. 2 is a photograph substituted for a drawing, showing an SEM observation image of a cross section of Example 1.

FIG. 3 is a photograph substituted for a drawing, showing an SEM observation image of a cross section of Comparative Example 1.

FIG. 4 is a photograph substituted for a drawing, showing a manner of analysis of Lc and Ld in Example 2.

FIG. 5 is a photograph substituted for a drawing, showing an SEM observation image of a cross section of a region that is in contact with both of a first porous layer and a second porous layer and that contains a metal oxide A and a metal oxide C, in Example 2.

DESCRIPTION OF EMBODIMENTS

As a result of studies by the present inventors, the present inventors found that the following porous ceramic laminate can reduce pressure loss of a fluid. That is, the porous ceramic laminate is a porous ceramic laminate including a first porous layer and a second porous layer, and the second porous layer is laminated on, in contact with or via air, the first porous layer. A part of the second porous layer is laminated on, in contact with, the first porous layer, and each of the first porous layer and the second porous layer contains a metal oxide. Further, a ratio Da/Db of an average pore diameter Da of the first porous layer relative to an average pore diameter Db of the second porous layer is 10 or more and preferably 30 or more, and a proportion of a portion in which a distance between the first porous layer and the second porous layer is smaller than 1 μm is 70% or less and preferably 50% or less.

The porous ceramic laminate of the present invention includes the first porous layer and the second porous layer laminated on, in contact with or via air, the first porous layer. A part of the second porous layer is laminated on, in contact with, the first porous layer. That is, a part of the second porous layer is laminated on, in contact with, the first porous layer, and the other part of the second porous layer is laminated on the first porous layer via air.

In the porous ceramic laminate of the present invention, the ratio Da/Db of the average pore diameter Da of the first porous layer relative to the average pore diameter Db of the second porous layer is 10 or more. Increasing the difference between Da and Db is important to reduce pressure loss of a fluid that permeates the porous ceramic laminate of the present invention. The ratio Da/Db is preferably 30 or more and 60 or less, more preferably 33 or more and 60 or less, further preferably 35 or more and 60 or less, and still further preferably 40 or more and 60 or less. In Patent Literature 1, the porous layer is formed on the porous support body by use of a slurry containing alumina having an average particle diameter of 3 or 5 μm. Based on the particle diameter of the alumina, it is considered that the average pore diameter of the porous layer is about 1 μm. As described above, the average pore diameter of the porous support body is 11.0 or 14.2 μm. Therefore, in Patent Literature 1, the ratio of the average pore diameter of the support body relative to the average pore diameter of the porous layer is considered to be about 14 at maximum. In Patent Literature 2, the continuous pore diameter of the support layer is 1 to 2 μm, and the pore diameter of the porous layer is 0.2 μm. Thus, the ratio of the continuous pore diameter of the support layer relative to the pore diameter of the porous layer is 10 at maximum.

As long as the ratio Da/Db is in the range described above, the value of each of Da and Db is not limited. Da is, for example, 1.5 μm or more and 600 μm or less, preferably 5 μm or more and 300 μm or less, and more preferably 9 μm or more and 60 μm or less. Db is, for example, 0.01 μm or more and 10 μm or less, preferably 0.05 μm or more and 5 μm or less, more preferably 0.15 μm or more and 1 μm or less, and further preferably 0.25 μm or more and 1 μm or less.

In the porous ceramic laminate of the present invention, the proportion of a portion (hereinafter, also referred to as a short-distance portion) in which the distance between the first porous layer and the second porous layer is smaller than 1 μm is 70% or less and preferably 50% or less. Causing the proportion of the short-distance portion to be a predetermined proportion or more is also important to reduce pressure loss of a fluid. A method for calculating the proportion of the short-distance portion is as follows. First, the porous ceramic laminate of the present invention is observed in a cross section parallel to the lamination direction of the first porous layer and the second porous layer. In the cross section, the proportion of a portion in which the distance between the first porous layer and the second porous layer is smaller than 1 μm is measured. The distance is a distance from the surface of the first porous layer to the surface, of the second porous layer, that is closest to the surface of the first porous layer. That is, in the cross section, the total length of the surface, of the second porous layer, at which the distance to the first porous layer is smaller than 1 μm is defined as Lc, and the total length of the surface, of the second porous layer, at which the distance to the first porous layer is 1 μm or more is defined as Ld. Then, Lc and Ld are measured, and the proportion of Lc relative to the total of Lc and Ld is obtained. FIG. 1 shows a schematic diagram of the cross section in a preferred mode of the present invention. In FIG. 1, the reference character 1 represents the first porous layer, the reference character 2 represents the second porous layer, the reference character 3 represents air, the reference character 4 represents the lamination direction of the second porous layer 2, the reference character 5 represents the distance between the first porous layer 1 and the second porous layer 2, the length of 5 is 1 μm, the reference character 6 represents a range in which the distance between the first porous layer 1 and the second porous layer 2 is smaller than 1 μm, the reference character 7 represents a range in which the distance between the first porous layer 1 and the second porous layer 2 is 1 μm or more, and the reference character 8 represents a region that is in contact with both of the first porous layer and the second porous layer and that contains a metal oxide A and a metal oxide C. Hereinafter, the region that is in contact with both of the first porous layer and the second porous layer and that contains the metal oxide A and the metal oxide C will be referred to as a "third region". With respect to the ranges 6 in each of which the distance between the first porous layer 1 and the second porous layer 2 is smaller than 1 μm, the total of the lengths of the surfaces of the second porous layer 2 each indicated by a thick solid line corresponds to Lc. With respect to the ranges 7 in each of which the distance between the first porous layer 1 and the second porous layer 2 is 1 μm or more, the total of the lengths of the surfaces of the second porous layer 2 each indicated by a normal solid line corresponds to Ld. In a case where the porous ceramic laminate of the present invention includes a third region, the distance between the first porous layer and the second porous layer that are in contact with the third region is regarded as 0. In the porous ceramic laminate of the present invention, the proportion of the short-distance portion, i.e., the proportion of Lc relative to the total of Lc and Ld is 70% or less, preferably 50% or less, more preferably 45% or less, further preferably 40% or less, still further preferably 30% or less, and particularly preferably 15% or less. From the viewpoint of adhesive strength between the first porous layer and the second porous layer, the proportion of Lc relative to the total of Lc and Ld is preferably 5% or more, more preferably 8% or more, and further preferably 10% or more.

As for the cross section, an image is obtained such that the total length of the surface of the second porous layer is not smaller than 100-fold of the average pore diameter of the first porous layer, and the proportion of Lc relative to the total of Lc and Ld may be measured.

The thickness of the first porous layer is, for example, 500 µm or more and 3000 µm or less, and preferably 1400 µm or more and 2800 µm or less. The thickness of the second porous layer is, for example, 3 µm or more and 30 µm or less, preferably 3 µm or more and 15 µm or less, and more preferably 3 µm or more and 10 µm or less. The second porous layer only needs to be laminated on at least one side surface of the first porous layer, and is preferably laminated on only one side surface of the first porous layer. The shape of the porous ceramic laminate of the present invention is not limited in particular, and may be a planar shape, a cylindrical shape, or a honeycomb shape, and a cylindrical shape is preferable. In a case where the porous ceramic laminate of the present invention has a cylindrical shape, the second porous layer may be laminated on either of the outer peripheral surface or the inner peripheral surface of the first porous layer, and is preferably laminated on only the outer peripheral surface or only the inner peripheral surface of the first porous layer, and more preferably laminated on only the outer peripheral surface of the first porous layer.

Each of the first porous layer and the second porous layer contains a metal oxide. In the present invention, the term "metal" is used to include a semimetal such as Si and Ge. The first porous layer preferably contains, as the metal oxide, a metal oxide A and a metal oxide B having a melting point higher than the melting point of the metal oxide A. The second porous layer preferably contains, as the metal oxide, a metal oxide C having a melting point higher than the melting point of the metal oxide A. The metal oxide B and the metal oxide C may be the same or different from each other.

When the first porous layer contains, as the metal oxide, the metal oxide A and the metal oxide B; and the second porous layer contains the metal oxide C as the metal oxide in the porous ceramic laminate of the present invention, the porous ceramic laminate preferably includes a third region. The third region improves adhesive strength between the first porous layer and the second porous layer. The number of third regions measured by methods according to Examples described later is 2 or more and 40 or less, preferably 2 or more and 20 or less, more preferably 5 or more and 20 or less, and further preferably 7 or more and 12 or less.

The porosity of the third region is normally smaller than the porosity of the first porous layer, and the average pore diameter of the third region is normally smaller than the average pore diameter of the first porous layer. The porosity of the third region is normally smaller than the porosity of the second porous layer, and the average pore diameter of the third region is normally smaller than the average pore diameter of the second porous layer.

Preferably, the metal oxide A has a melting point of 95° C. or higher and 1600° C. or lower. Specific examples of the metal oxide A include $B_2O_3$, $SiO_2$, $GeO_2$, $Al_2O_3$, $V_2O_5$, $As_2O_5$, $Sb_2O_5$, $ZrO_2$, $TiO_2$, $ZnO$, $PbO$, $ThO_2$, $BeO$, $CdO$, $Ta_2O_5$, $Nb_2O_5$, $WO_3$, $ScO_2$, $La_2O_3$, $Y_2O_3$, $SnO_2$, $Ga_2O_3$, $In_2O_3$, $PbO_2$, $MgO$, $Li_2O$, $BaO$, $CaO$, $SrO$, $Na_2O$, $K_2O$, $Rb_2O$, $HgO$, $Cs_2O$, $Ag_2O$, $TeO_2$, and $Tl_2O$, and a preferable example is $SiO_2$. That is, examples of the metal oxide A include those containing at least one type of the above oxides as a component. The metal oxide A is preferably a glass containing, as a component, at least one of the above oxides in particular, and is preferably a glass containing an oxide of silicon ($SiO_2$ in particular) such as quartz glass, borosilicate glass, or aluminosilicate glass in particular. The metal oxide B and the metal oxide C may be the same or different from each other, and preferably each have a melting point of 2000° C. or higher and 2800° C. or lower. Specific examples of the metal oxide B and the metal oxide C include $Al_2O_3$, $ZrO_2$, $MgO$, $Cr_2O_3$, and $Y_2O_3$, and a preferable example is $Al_2O_3$.

A surface roughness Ra of the surface of the second porous layer in the porous ceramic laminate of the present invention varies depending on the surface roughness of the first porous layer, the particle diameter of the metal oxide forming the second porous layer, and the like, and, for example, 0.5 µm or more and 7 µm or less, and preferably 1 µm or more and 5 µm or less. The surface roughness Ra of the first porous layer before being laminated by the second porous layer is, for example, 5 µm or more and 15 µm or less, and preferably 7 µm or more and 10 µm or less. The surface roughness of the surface of the second porous layer in the porous ceramic laminate of the present invention can be smaller than the surface roughness of the first porous layer before being laminated by the second porous layer.

The porous ceramic laminate of the present invention can reduce pressure loss of a fluid. The permeance of the porous ceramic laminate of the present invention can be practically sufficient, i.e., the permeance evaluated in Examples described later can be $3.0 \times 10^{-6}$ m³/(m²·sec·Pa), and preferably $7.0 \times 10^{-6}$ m³/(m²·sec·Pa) or more. The permeance is preferably $0.8 \times 10^{-5}$ m³/(m²·sec·Pa) or more and more preferably $1.0 \times 10^{-5}$ m³/(m²·sec·Pa) or more, and is $5.0 \times 10^{-5}$ m³/(m²·sec·Pa) or less, for example.

As described above, in the porous ceramic laminate of the present invention, the ratio Da/Db of the average pore diameter Da of the first porous layer relative to the average pore diameter Db of the second porous layer is 10 or more and preferably 30 or more. Normally, when two layers having such a large difference in the average pore diameter are to be laminated together, components of the second porous layer are taken into pores of the first porous layer having a large average pore diameter. Thus, it is difficult to form the second porous layer in a smooth layer shape on the first porous layer.

A method for producing the porous ceramic laminate of the present invention includes: a step of applying a water repellent agent or an oil repellent agent to at least one surface of the first porous layer; a step of applying a slurry containing a thickener, a solvent, and the metal oxide contained in the second porous layer to the surface of the first porous layer to which the water repellent agent or the oil repellent agent has been applied; and a step of heat-treating the first porous layer to which the slurry has been applied. According to the method of the present invention, since the slurry is not taken into pores of the first porous layer, the second porous layer having a small average pore diameter can be laminated on the first porous layer having a large average pore diameter.

The water repellent agent or the oil repellent agent only needs to have at least one of a water repelling function and an oil repelling function, and may be a water and oil repellent agent having both of a water repelling function and an oil repelling function. Examples of the water repellent agent or the oil repellent agent include a paraffin-based water and oil repellent agent, a fluorine-based water and oil repellent agent, and a polysiloxane-based water and oil repellent agent. The method for applying the water repellent agent or the oil repellent agent to at least one surface of the first porous layer is not limited in particular, and examples thereof include spray coating, dip coating, bar coating, suction coating, ultrasonic spraying, brush coating, squeegee application, and wipe application.

Examples of the solvent include water and organic solvents. The metal oxide contained in the second porous layer preferably includes the metal oxide C. The concentration of the metal oxide in the slurry is, for example, 2 mass % or more and 15 mass % or less, and preferably 4 mass % or more and 13 mass % or less. In a case where the second porous layer contains a plurality of types of metal oxides, the concentration means the total concentration of the plurality of types of metal oxides. The average particle diameter of the metal oxide contained in the second porous layer is, for example, 0.1 μm or more and 50 μm or less.

Examples of the thickener include methyl cellulose, hydroxyethyl methyl cellulose, hydroxyethyl cellulose, hydroxypropyl methyl cellulose, polyalkylene oxide, polyvinyl alcohol, sodium polyacrylate, polyvinylpyrrolidone, polyacrylamide, and polydimethyl aminoethyl methacrylate. The concentration of the thickener in the slurry is, for example, 0.5 mass % or more and 5 mass % or less, and preferably 1 mass % or more and 3 mass % or less.

The method for applying the slurry to the surface of the first porous layer to which the water repellent agent or the oil repellent agent has been applied is not limited in particular, and examples thereof include a dip coating method, a spray coating method, a roll coating method, a bar coating method, a spin coating method, a slit coating method, and brush coating.

The temperature of the heat treatment is, for example, 95° C. or higher, preferably 265° C. or higher, more preferably 500° C. or higher, and further preferably 1000° C. or higher. The temperature of the heat treatment is, for example, 1600° C. or lower, and preferably 1400° C. or lower. The temperature of the heat treatment is preferably not lower than the softening temperature of the metal oxide A. Specifically, the temperature of the heat treatment is preferably 1000° C. or higher and 1500° C. or lower, and more preferably 1100° C. or higher and 1400° C. or lower. When the temperature of the heat treatment is not lower than the softening temperature of the metal oxide A, a phenomenon in which, in the heat treatment, a melted matter containing the metal oxide A partially flows from the first porous layer into the second porous layer may occur. As a result, a third region is formed partially in the porous ceramic laminate of the present invention obtained after the heat treatment. The retention time at the temperature of the heat treatment is, for example, 30 minutes or longer and 10 hours or shorter, preferably 1 hour or longer and 8 hours or shorter, and more preferably 3 hours or longer and 7 hours or shorter.

The porous ceramic laminate of the present invention can be used as a microfiltration membrane. When a function membrane is further laminated on the second porous layer in the porous ceramic laminate of the present invention, the porous ceramic laminate of the present invention on which the function membrane has been laminated can also be used as a substrate of a membrane such as an ultrafiltration membrane, a nanofiltration membrane, a reverse osmosis membrane, an ion-exchange membrane, or a gas separation membrane.

The present application claims priority to Japanese Patent Application No. 2018-194512 filed on Oct. 15, 2018, the entire contents of which is incorporated herein by reference.

EXAMPLES

The present invention will be described in more detail below by means of examples. The present invention is not limited by the following examples, and can also be carried out with appropriate modifications being made within the scope of the gist described above and below, and any of these modifications are included in the technical scope of the present invention.

Ceramic laminates obtained in Examples and Comparative Examples below were evaluated by the method below.

(1) Measurement of Permeance

Air was flowed at a constant flow rate of 1.0 m³/h from the outer side of a cylindrical porous ceramic laminate sample, and air was caused to permeate the sample through the inside thereof. The pressure difference before and after the permeation through the sample was measured. The permeance was calculated by the following formula by use of the measured result.

$$\text{Permeance}\left(\frac{m^3}{m^2 \cdot sec \cdot Pa}\right) = \frac{\text{flow rate}\left(\frac{m^3}{h}\right)/3600}{\{\text{pressure difference (Pa) at measurement of sample} - \text{pressure difference (Pa) measured without sample}\} \times \text{membrane area (m}^2\text{)}} \quad \text{[Math 1]}$$

(2) Measurement of Lc and Ld and Confirmation of Third Region

A cylindrical porous ceramic laminate was cut at a cross section perpendicular to the axial direction, and was embedded in a resin such that the cross section could be observed. Then, the cross section was polished and observed with a scanning electron microscope (SEM). An image was obtained such that the total length of the surface of the second porous layer on the side of the first porous layer is 2 mm or more in the circumferential direction. Further, a total length Lc of the surface of the second porous layer, where the distance to the first porous layer is smaller than 1 μm, and a total length Ld of the surface of the second porous layer, where the distance to the first porous layer is 1 μm or more were measured, respectively. Then, the proportion of Lc relative to the total of Lc and Ld was calculated. In addition, the number of third regions present in the above-mentioned range of 2 mm of the SEM observation image was counted.

(3) Measurement of Pore Diameter

The porous ceramic laminate sample was dried for 4 hours at 120° C., and then, measurement was performed according to a mercury intrusion method by use of AutoPore IV9520 (manufactured by Micromeritics). When the first porous layer before being laminated by the second porous layer, and a porous ceramic laminate sample of each Example below were measured, in a log-differentiation pore volume distribution of which the horizontal axis represents pore diameter, one peak was observed in the first porous layer before being laminated by the second porous layer, and two peaks were observed in the porous ceramic laminate of each Example below. The peak position observed in the first porous layer before being laminated by the second porous layer was defined as Da. Out of the two peaks observed in the porous ceramic laminate of each Example below, the peak position on the smaller pore diameter side was defined as Db.

(4) Method for Measuring Surface Roughness

235 μm×220 μm of the outer peripheral surface of the porous ceramic laminate sample was measured at a pitch of 0.5 μm in the Z direction under a 10-fold magnification objective lens by use of a laser microscope VK-9510 manufactured by KEYENCE, and an arithmetic mean surface roughness Ra was measured. The surface roughness Ra of the surface of the first porous layer before being laminated by the second porous layer in each Example below was 9.3 μm.

(5) Evaluation of Membrane Strength

A scotch mending tape, manufactured by 3M, in a size of 5 mm×5 mm was attached to the outer peripheral surface of the porous ceramic laminate sample and then peeled off. When peering of the outer peripheral surface was scarcely observed, the porous ceramic laminate sample was evaluated as ○, and when significant peering of the outer peripheral surface was observed, the porous ceramic laminate sample was evaluated as ×.

(6) Measurement of Thickness of Second Porous Layer

A cylindrical porous ceramic laminate was cut at a cross section perpendicular to the axial direction, and was embedded in a resin such that the cross section could be observed. Then, the cross section was polished and observed with a scanning electron microscope (SEM). An image was obtained such that a line of the second porous layer corresponding to the surface on the side of the first porous layer was 250 μm or more in the circumferential direction. Then, the area of the second porous layer was obtained and divided by the length of the circumferential direction, whereby the thickness was calculated.

Examples 1 to 4

An alumina substrate A-12, manufactured by Hagi Glass, containing alumina and $SiO_2$ was used as the first porous layer. The substrate A-12 was in a cylindrical shape having an inner diameter of 8.6 mm, an outer diameter of 11.5 mm, and a length of 5 cm. A water and oil repellent spray "AMEDAS" manufactured by COLUMBUS Inc. was sprayed to be applied to the outer peripheral surface of the substrate A-12, and the resultant matter was dried. The water and oil repellent spray contains a fluororesin and a petroleum-based hydrocarbon. Next, an alumina powder AKP-3000 manufactured by Sumitomo Chemical Co., Ltd. and a hydroxypropyl methyl cellulose 65SH-30000, as a thickener, manufactured by Shin-Etsu Chemical Co., Ltd. were mixed in water at a concentration shown in Table 1, to prepare a slurry. The average particle diameter of the alumina powder AKP-3000 was 0.7 μm. The upper end and the lower end of the substrate A-12 were sealed so as to prevent the slurry from advancing to the inner peripheral surface of the substrate A-12, and then, the substrate A-12 was dip-coated with the slurry. Then, the substrate A-12 with the slurry applied on the outer peripheral surface thereof was heat-treated for 3 hours at 1200° C.

Comparative Example 1

Comparative Example 1 was prepared similarly to Example 1 except that the substrate A-12, without a water and oil repellent spray applied thereto, was dip-coated with the same slurry as that in Example 1 and that the temperature of the heat treatment was 1100° C.

Example 5

Example 5 was prepared similarly to Example 1 except that a porous layer having a pore diameter of 4.8 μm was used as the first porous layer, and that the concentration of the thickener for the slurry was 1.5 wt %.

Comparative Example 2

Comparative Example 2 was prepared similarly to Example 5 except that the water and oil repellent spray was not applied.

Comparative Example 3

Comparative Example 3 was prepared similarly to Example 5 except that a porous layer having a pore diameter of 1.8 μm was used as the first porous layer.

Table 1 shows the results. FIG. 2 shows an SEM observation image of the cross section of Example 1. FIG. 3 shows an SEM observation image of the cross section of Comparative Example 1. FIG. 4 shows a manner of analysis of Lc and Ld in Example 2. FIG. 5 shows an SEM observation image of the cross section, capturing a third region in Example 2.

TABLE 1

| | Water and oil repellent treatment | Slurry for forming second porous layer | | | First porous layer | Second porous layer | |
| --- | --- | --- | --- | --- | --- | --- | --- |
| | | Concentration of alumina (mass %) | Concentration of thickener (mass %) | Heat treatment temperature (° C.) | Pore diameter Da (μm) | Pore diameter Db (μm) | Thickness (μm) |
| Example 1 | YES | 5.0 | 1.0 | 1200 | 14.7 | 0.31 | 7.4 |
| Example 2 | YES | 5.0 | 2.0 | 1200 | 14.7 | 0.42 | 13.3 |
| Example 3 | YES | 5.0 | 2.5 | 1200 | 14.7 | 0.42 | 14.0 |
| Example4 | YES | 10.0 | 1.0 | 1200 | 14.7 | 0.31 | 15.2 |
| Comparative Example 1 | No | 5.0 | 1.0 | 1100 | 14.7 | Layer was not formed | |
| Example 5 | YES | 5.0 | 1.5 | 1200 | 4.8 | 0.25 | 11.5 |

TABLE 1-continued

| | | Lc/(Lc + Ld) (%) | Surface roughness Ra (μm) | Formation of second porous layer | Number of third region | Permeance {m³/(m²·sec·Pa)} | membrane strength |
|---|---|---|---|---|---|---|---|
| Comparative Example 2 | No | 5.0 | 1.5 | 1200 | 4.8 | 0.25 | 16.6 |
| Comparative Example 3 | YES | 5.0 | 1.5 | 1200 | 1.8 | 0.25 | 12.6 |

| | Da/Db | Lc/(Lc + Ld) (%) | Surface roughness Ra (μm) | Formation of second porous layer | Number of third region | Permeance {m³/(m²·sec·Pa)} | membrane strength |
|---|---|---|---|---|---|---|---|
| Example 1 | 47 | 14 | 3.8 | YES | 2 | $1.4 \times 10^{-5}$ | ○ |
| Example 2 | 35 | 22 | 3.7 | YES | 12 | $1.4 \times 10^{-5}$ | ○ |
| Example 3 | 35 | 19 | 3.6 | YES | 8 | $1.3 \times 10^{-5}$ | ○ |
| Example 4 | 47 | 44 | 2.0 | YES | 13 | $9.3 \times 10^{-6}$ | ○ |
| Comparative Example 1 | — | — | — | No | — | Second porous layer was not formed | — |
| Example 5 | 19 | 69 | 3.4 | YES | 39 | $3.7 \times 10^{-6}$ | ○ |
| Comparative Example 2 | 19 | 83 | 3.5 | YES | 55 | $2.7 \times 10^{-6}$ | ○ |
| Comparative Example 3 | 7 | 82 | 3.4 | YES | 6 | $1.0 \times 10^{-6}$ | ○ |

As shown in FIG. 2, in Example 1, where the water and oil repellent spray was applied to the substrate A-12 serving as the first porous layer and then dip-coated with the slurry, a second porous layer including alumina was formed on the first porous layer. Meanwhile, as shown in FIG. 3, in Comparative Example 1, where the water and oil repellent spray was not used, alumina was taken into pores in the first porous layer deeply, and no second porous layer was able to be formed on the first porous layer. FIG. 4 shows a cross section parallel to the lamination direction of the first porous layer and the second porous layer in Example 2. In the surface of the second porous layer on the side of the first porous layer, a range in which the distance to the first porous layer is smaller than 1 μm is indicated by a black solid line, and a range in which the distance to the first porous layer is 1 μm or more is indicated by a white solid line. The range indicated by the black solid line corresponds to the range indicated as 6 in FIG. 1. The range indicated by the white solid line corresponds to the range indicated as 7 in FIG. 1. In Examples 1 to 5, the proportion of Lc/(Lc+Ld) obtained from Lc and Ld measured in the manner shown in FIG. 4 was 70% or less, and the permeance when air was flowed into the porous ceramic laminate was $3.0 \times 10^{-6}$ m³/(m²·sec·Pa) or more and preferably $7.0 \times 10^{-6}$ m³/(m²·sec·Pa) or more. As shown in FIG. 5, in Example 2, the situation where the glass component in the first porous layer melted and oozed out into the second porous layer and solidified to form the third area is observed at the area surrounded by the white solid line. The first porous layer and the second porous layer are favorably adhered to each other. This also matches the result of the membrane strength shown in Table 1. Since Comparative Example 2 had a proportion of Lc/(Lc+Ld) exceeding 70%, and Comparative Example 3 had a value of Da/Db smaller than 10 and a proportion of Lc/(Lc+Ld) exceeding 70%, Comparative Example 2 and Comparative Example 3 had reduced permeance values.

DESCRIPTION OF THE REFERENCE CHARACTERS

1 first porous layer
2 second porous layer
3 air
4 lamination direction of second porous layer
5 distance between first porous layer 1 and second porous layer 2
6 range in which distance between first porous layer 1 and second porous layer 2 is smaller than 1 μm
7 range in which distance between first porous layer 1 and second porous layer 2 is 1 μm or more
8 third region

The invention claimed is:

1. A porous ceramic laminate comprising a first porous layer and a second porous layer, wherein
    the second porous layer is laminated on, in contact with or via air, the first porous layer,
    a part of the second porous layer is laminated on, in contact with, the first porous layer,
    each of the first porous layer and the second porous layer contains a metal oxide,
    a ratio Da/Db of an average pore diameter Da of the first porous layer relative to an average pore diameter Db of the second porous layer is 10 or more,
    Da is 1.5 μm or more, and
    a proportion of a portion in which a distance between the first porous layer and the second porous layer is smaller than 1 μm is 70% or less.

2. The porous ceramic laminate according to claim 1, wherein the Da/Db is 30 or more.

3. The porous ceramic laminate according to claim 2, wherein the proportion of the portion in which the distance between the first porous layer and the second porous layer is smaller than 1 μm is 50% or less.

4. The porous ceramic laminate according to claim 3, wherein
    the first porous layer contains, as the metal oxide, a metal oxide A and a metal oxide B having a melting point higher than a melting point of the metal oxide A,
    the second porous layer contains, as the metal oxide, a metal oxide C having a melting point higher than the melting point of the metal oxide A, and
    the porous ceramic laminate includes a region that is in contact with both of the first porous layer and the second porous layer and that contains the metal oxide A and the metal oxide C.

5. The porous ceramic laminate according to claim 2, wherein
    the first porous layer contains, as the metal oxide, a metal oxide A and a metal oxide B having a melting point higher than a melting point of the metal oxide A, the second porous layer contains, as the metal oxide, a metal oxide C having a melting point higher than the melting point of the metal oxide A, and the porous ceramic laminate includes a region that is in contact with both of the first porous layer and the second porous layer and that contains the metal oxide A and the metal oxide C.

6. The porous ceramic laminate according to claim 1, wherein the proportion of the portion in which the distance between the first porous layer and the second porous layer is smaller than 1 μm is 50% or less.

7. The porous ceramic laminate according to claim 1, wherein the first porous layer contains, as the metal oxide, a metal oxide A and a metal oxide B having a melting point higher than a melting point of the metal oxide A, the second porous layer contains, as the metal oxide, a metal oxide C having a melting point higher than the melting point of the metal oxide A, and the porous ceramic laminate includes a region that is in contact with both of the first porous layer and the second porous layer and that contains the metal oxide A and the metal oxide C.

8. A method for producing the porous ceramic laminate according to claim 1, the method comprising:

a step of applying a water repellent agent or an oil repellent agent to at least one surface of the first porous layer;

a step of applying a slurry containing a thickener, a solvent, and the metal oxide contained in the second porous layer, to the surface of the first porous layer to which the water repellent agent or the oil repellent agent has been applied; and a step of heat-treating the first porous layer to which the slurry has been applied.

\* \* \* \* \*